ACTINIC RADIATION SENSITIVE PHOSPHATIDE COMPOUNDS

Filed Feb. 5, 1969 2 Sheets-Sheet 1

ACTINIC RADIATION SENSITIVE PHOSPHATIDE COMPOUNDS

Filed Feb. 5, 1969 2 Sheets-Sheet 2

United States Patent Office 3,585,031
Patented June 15, 1971

3,585,031
ACTINIC RADIATION SENSITIVE PHOSPHATIDE COMPOUNDS

Lester P. Hayes, Decatur, Ill., assignor to A. E. Staley Manufacturing Company, Decatur, Ill.
Filed Feb. 5, 1969, Ser. No. 796,841
Int. Cl. G03c 7/02
U.S. Cl. 96—33 25 Claims

ABSTRACT OF THE DISCLOSURE

Method of forming and developing latent images from an element bearing a layer of solid, substantially oil-free phosphatide particles.

BACKGROUND OF THE INVENTION

This invention relates to phosphatides which have been sensitized by light and to methods for the preparation of same and products produced of same and it relates more particularly to the production and to the method for producing products of phosphatides which, in response to exposure to light, are capable of new and novel reactions which enable use of such phosphatides in fields heretofore unavailable.

An important concept of this invention resides in the discovery that certain phosphatides, as will hereinafter be described, are light sensitive or can be made light sensitive whereby, upon exposure to light, the light rays have an effect to cause modification of a phosphatide molecule whereby the exposed phosphatide differs from the unexposed phosphatide molecule from the standpoint of physical and mechanical properties as well as chemical activity whereby new and novel usages can be made of such phosphatides in the production of products not heretofore available from phosphatides. The theory on which the modification of the phosphatide occurs responsive to exposure to light has not yet been established. It is believed that exposure of the particular phosphatide to a light reaction operates to provide a phosphatide having one or more free radicals whereby the phosphatide is capable alone or in combination with heat and/or metal salts and/or oxidizing agents of reaction to produce a number of unique products, as will hereinafter be described.

Whatever theory may be ascribed for the reaction of the phosphatide responsive to exposure to light, with or without the additional catalytic effects or reactions with heat, metal salts, or oxidizing agents, it is known that the original water insoluble, hydrocarbon soluble phosphatide becomes water soluble and hydrocarbon insoluble responsive to exposure to light and that such changes in solubility characteristics can be increased both in intensity and in rate by heat and/or by metal salts and/or by oxidizing agents with which the phosphatide is reacted during exposure or afterwards. When I indicate the phosphatide becomes water soluble on exposure to light, I mean that upon flushing a light exposed phosphatide coated surface with water, the light exposed phosphatide areas will be emulsified or dissolved by the water, resulting in the removal of the light exposed areas at a rate markedly faster than the unexposed areas. For all intents and purposes there is essentially complete removal of light exposed areas without any removal of unexposed area. Other reactions which are presently foreign to phosphatides have been experienced to enable uses to be made of the phosphatides in fields remote from present concepts and applications.

While many uses can be made of phosphatides processed in accordance with the practice of this invention, illustration of the unique characteristics will be made by reference to usage in the field of graphic arts and more specifically in the preparation of presensitized photolithographic masters in which the master can be imaged in response to exposure to light. The exposed master can be developed as a negative working master for the production of multiple copies by conventional lithographic duplicating technique or it can be developed as a positive working master for the production of multiple copies by the same conventional lithographic duplicating processes. The combination to make use of heat and/or metal salts and/or oxidizing agents as catalysts or promoters, during exposure or afterwards, enhances the rate of image development as well as image resolution whereby more copies of better copy quality can be produced from the exposed master with less toning and lesser sensitivity to the ink-water balance.

However, I believe that the exposure of phosphatide films or elements to actinic radiation (light, beta-rays, X-rays, etc.) produces a latent image which can be developed in many ways, for single copy work, for multiple copy or for preparation of an imaged duplicating master, such as by longer exposure to actinic radiation, heat, physical means, chemical means, etc. The developed image areas differ from the undeveloped areas in being (A) water soluble and hydrocarbon insoluble, (B) having a high concentration of peroxides, (C) dispersing in water to yield a low pH or acid system, etc.

For example, a latent image is formed by exposing a light sensitive phosphatide element to a 20 ampere carbon arc at 24 inches for 2 minutes or less. If exposure is continued, a visible image begins to develop after about 20 minutes, with a strong visible image developing after about one hour. Essentially, the same effect is obtained using beta-rays. The latent image formed after a short exposure can be developed to a clearly visible image by heating the exposed light-sensitive element in the dark at a temperature up to about 450° F. for a short time. The speed of image development is directly proportional to the development temperature. If stored in the dark without heating, a clearly visible image forms in from about 1 to 7 days. The latent image imposed by light can be developed chemically by immersing the exposed film in aqueous cuprous ammonium chloride. Copper or copper oxide is deposited in the exposed areas, forming a well defined image. A latent image imposed upon a phosphatide film by light, beta and X-rays can be developed quickly and sharply by immersing the exposed plate in an aqueous iodide salt (KI) solution. Peroxides formed in the exposed phosphatide areas free $I_2$ producing a distinct brown image. A sharper blue image is formed if the iodide solution contains pasted starch. Peroxides formed in the exposed areas can be utilized as free radical polymerization catalysts by placing an imaged phosphatide film in face to face relationship with a polymerizable printing plate such as one comprising a mixture of pre-formed polymer (e.g. cellulose acetate succinate, polyol-alpha, beta-ethylenically unsaturated alpha, beta dicarboxylic acid condensates) and ethylenically unsaturated cross-linkers such as diethyleneglycol dimethacrylate. The liberated peroxides in the resulting element initiate the polymerization of the polymerizable composition. If desired, heat can be used in order to speed up polymerization. A latent imaged print can be developed physically by coating the plate with a thin layer of non-polar relatively high melting wax. The element is then subjected to heat above the melting point of the wax. As the image develops, the non-polar wax flows away from the hydrophilic image areas and when cooled, forms a "deep etched type," "engraved" or an image (positive or negative) in relief on the surface. This latter method of physical development can be reversed by using a polar high melting and water soluble system that would be attracted to the developed image areas. Typical polar materials which may be used in this manner include sorbitol, dextrose, polar resins, such as polyvinyl acetate and polyvinyl alcohol.

Thus it is an object of this invention to produce and to provide a method for producing phosphatide derivatives having new and novel characteristics and it is a related object to produce new and novel products making use of same.

More specifically, it is an object of this invention to produce and to provide a method for producing new and novel products by reaction of a phosphatide with light alone or in combination with other materials whereby the phosphatide is formed into a substance having many new and novel characteristics and uses and it is a related object to produce a number of products in which use is made of the new and novel reaction of a phosphatide and substance produced therewith.

Still more specifically, it is an object of this invention to produce and to provide a method for producing copy and more particularly a light sensitive duplicating master which makes use of phosphatides on the imageable surface and it is a particular object of this invention to produce and to provide a method for producing a lithographic master, a resist master, a spirit master and the like duplicating master for use in the field of graphic arts.

These and other objects and advantages of this invention will hereinafter appear and for purposes of illustration, but not of limitation, an embodiment of the invention is shown in the accompanying drawings, in which.

Figures 1, 2:
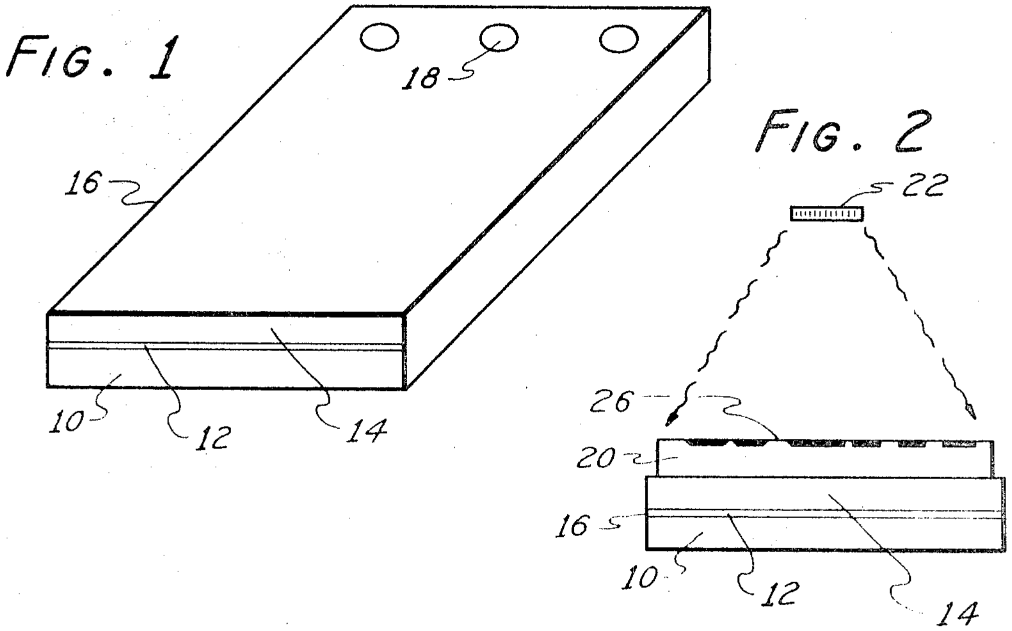
FIG. 1 is a perspective view partially in section of a light sensitive lithographic master embodying the features of this invention.
FIG. 2 is a schematic sectional elevational view showing the exposure of the master of FIG. 1 to a negative transparency.
Figures 3, 4, 5:
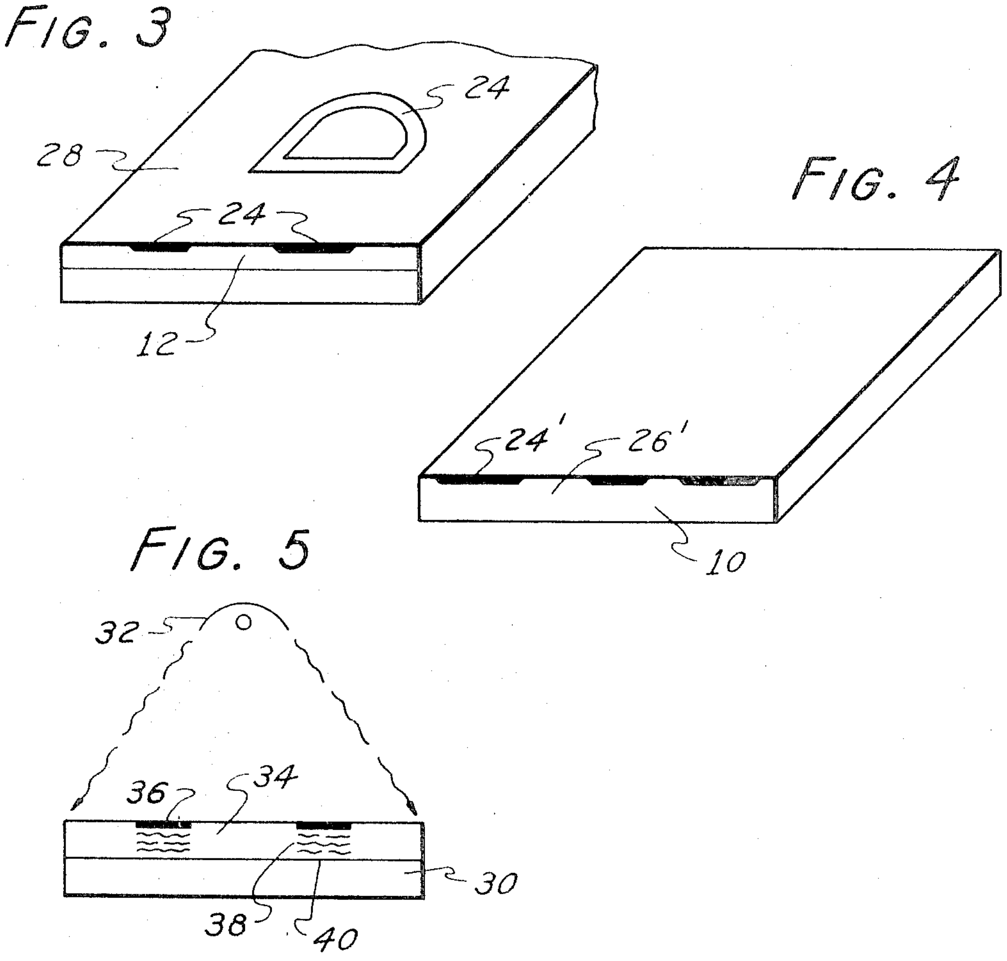
FIG. 3 is a perspective view partially in section of the imaged master of FIG. 1.
FIG. 4 is a perspective view of an imaged positive working plate.
FIG. 5 is a sectional elevational view showing the arrangement of elements in a lithographic plate imaged thermographically.
Figure 6:
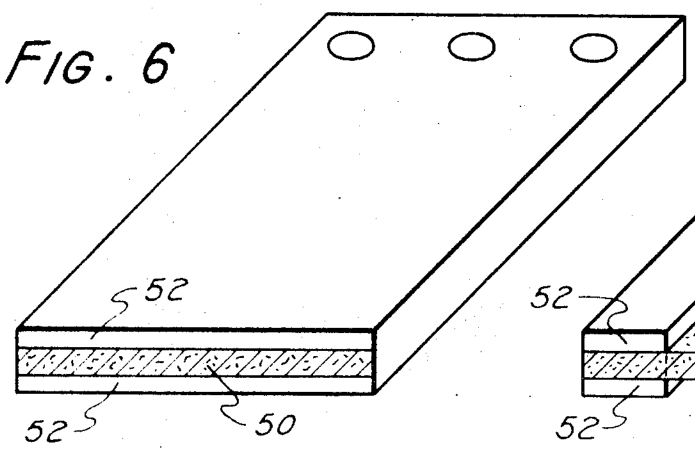
FIG. 6 is a perspective view partially in section of a stencil sheet embodying the features of this invention.
Figure 7:
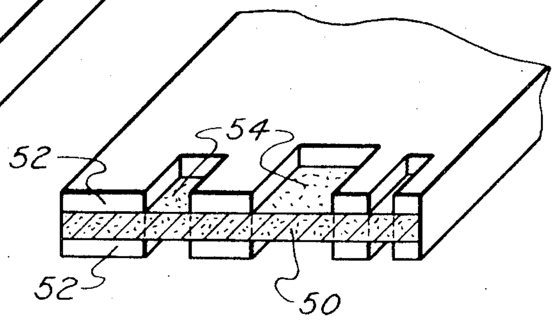
FIG. 7 is a perspective view partially in section of the imaged stencil of FIG. 6.

As used herein, the term "phosphatide" is intended to refer to vegetable phosphatides such as are derived from soybean (often commercially referred to as lecithin), corn, wheat, cottonseed, rice, linseed, peanut, sesame seed and rape seed; animal tissue phosphatides, such as are derived from the brain, spinal cord, liver, heart and kidney; and animal fat phosphatides such as are derived from butter, egg yolk, and the fat of beef, hogs, mutton and the like. The phosphatides employed in the practice of this invention are of the type which are substantially insoluble in acetone (at least 90% insoluble in acetone) and substantially oil-free (containing not more than 10% by weight oil). Included also are the fractions of such phosphatides including the alcohol soluble fractions and the alcohol insoluble fractions (cephalin) and modified phosphatides such as hydroxylated lecithin, as described in the Wittcoff Pat. No. 2,445,948. The term is intended to include synthetic phosphatides having a structure corresponding to the natural products and fractions and derivatives thereof.

The following will illustrate the concepts of this invention by way of preparation and imaging of a photolithographic master:

EXAMPLE 1

Plate or master preparation

A substrate in the form of a flexible base sheet 10 having a water receptive, water insoluble, hydrophilic, ink repellent surface 12 is flow-coated with a 2% solution of dry, oil-free soybean lecithin in hexane. The applied coating 14 is allowed to air dry or drying can be accelerated by air heated to an elevated temperature up to about 350° F. whereby a thin continuous layer 14 of the solid substantially oil-free lecithin is formed on the lithographic surface 12 to produce the lithoraphic plate 16. Openings 18 or other means are provided in the leading edge portion of the plate for hooking or otherwise mounting the master on the plate cylinder of a lithographic or printing press.

EXAMPLE 2

The lithographic plate 16 of Example 1 is exposed to light through a negative transparency 20. Exposure for from 2 to 60 minutes with a carbon arc 22 is sufficient. The exposed plate is separated from the negative and the layer 14 is swabbed or washed with hexane. The portion of the coating 14 that has been exposed to light becomes insoluble in the hexane and remains as an ink receptive image 24 on the surface of the plate while the hexane soluble unexposed portions 26 of the lecithin coating are dissolved away by the hexane to free the underlying lithographic surface 12 which defines the non-imaged portion 28 of the imaged plate.

Development of the image is completed by gumming the plate in the usual manner, as with a dilute solution of gum arabic and then inking the plate. Gumming is not essential for development of the imaged plate.

Thereafter the imaged plate, with or without gumming, can be mounted on a conventional lithographic press and repeatedly wet with aqueous repellent and greasy ink whereby the aqueous repellent wets out the non-imaged hydrophilic portions 28 of the plate while ink is received on the imaged portions 24 for transfer to copy paper in a direct transfer process or onto a blanket for offset in the production of multiple copies of the image as developed on the suface of the plate.

Exposure of the phosphatides of this invention to light, while in the solid state, as distinguished from the dissolved state, brings about a reorganization of the structure of the phosphatide as shown by spectral analysis whereby in response ot light alone or in combination with other substances and conditions such as temperature, oxidation and the like, the unexposed portion of the lecithin remains soluble in normal fat solvents while the exposed portions become insoluble in normal fat solvents whereby wetting the exposed plate with solvent, the lecithin in the unexposed portions of the coating is removed by solution while the exposed lecithin remains to form the ink receptive image. Exposure to light also changes drastically the pH of the exposed phosphatide areas. It is believed that the described characteristics depend upon exposure of the phosphatide while in the solid state, including a phosphatide which is substantially oil-free and substantially acetone insoluble, as previously described. Having described the basic concepts for exposure of the light sensitive phosphatide in the development of a light sensitive photolithographic plate, reference will now be made to various modifications which may be practiced in the process and the various ramifications which can be made in the utilization of such characteristics in light sensitive phosphatides.

First, with reference to the composition employed in the practice of Examples 1 and 2, the soy lecithin that is employed in the preparation of the plate in Example 1 can be replaced, in whole or in part, by others of the phosphatides of the types previously described. For example, the soy lecithin can be replaced by corn phosphatides, egg yolk phosphatide, and the like.

It is desirable for purposes of resolution of the image with minimum exposure to make use of a phosphatide coating which is as thin as possible. However, the intensity and time of exposure should be balanced to provide a phosphatide layer which is of sufficient depth and durability for use in the preparation of an image from which a large number of copies of good quality can be secured. These conditions can be met by the use of a phosphatide layer having a thickness as little as 0.00012 gram per square foot of plate surface but it is preferred to make use of a plate having a minimum thickness of phosphatide coating in a coating weight of 0.01 gram per square foot such as may be achieved from solutions in hexane containing 0.0025 and 0.25 percent by weight of the phosphatide respectively. Coating weights in amounts up to 0.25 gram per square foot can be used but it is preferred to limit the coating weight to an amount less than 0.1 gram per square foot and such coating weights may be obtained from coating compositions containing 2 to 5 percent by weight and 0.25 percent by weight phosphatide respectively. Coating weights in amounts greater than 0.25 gram per square foot can be employed but it is undesirable from the standpoint of wearability, image intensity, insolubility and time of exposure as well as development to make use of coatings having coating weights greater than 0.25 gram per square foot.

Instead of making use of a coating composition in which the phosphatide is dissolved in hexane, use can be made of compositions in which the solvent system in which the phosphatide is dissolved comprises a fat solvent including hydrocarbons and halogenated hydrocarbons such as hexane, trichloroethylene, pentane, heptane, chlorohexane, chloroform, carbon tetrachloride, and the like, and aromatic and substituted aromatic hydrocarbons such as benzene, toluene, chlorobenzene and the like, and heterocyclic solvents such as furan. If desired, a phosphatide coated plate having a larger light-sensitive phosphatide surface area can be prepared by applying a suspension of phosphatide particles in a non-solvent such as acetone, methyl ethyl ketone, etc. Likewise, aqueous emulsions have been utilized advantageously. In any method of operation the phosphatide layer should be sufficient to cover the entire surface with a substantially continuous layer of solid phosphatide particles. Other methods for production of phosphatide coating are hereinafter set forth.

Aqueous emulsion

A brushed grained aluminum plate was coated by swabbing the surface with a 2% dispersion (emulsion) of soy phosphatide in distilled water. This dispersion had been prepared directly before application in a Waring Blendor (at high shear). The surface is coated by "drawing" or swabbing since the aqueous emulsion is cohesive and pituitous and puddles except in very thin films. On drying, the film was "dull" in appearance as compared to the more "glossy" films resulting from coating the aluminum plate by flushing with a hexane solution. The coated plate was exposed under a negative for one hour in a weatherometer and desensitized and developed as Example 4.

Acetone dispersion

A very fine dispersion in acetone of oil-free acetone insoluble phosphatides can be prepared by subjecting the precipitated material to high shear using a Waring Blendor. This fine dispersion when flushed onto a brush grained aluminum plate deposits a fine grainy surface. This surface, though discontinuous, can be exposed, desensitized and developed to produce a functioning lithographic plate in the manner of Example 4.

Aerosol application

A ten percent by weight solution of oil-free soy phosphatide in petroleum ether was prepared. This solution was placed in an aerosol can and phased with isobutane to produce a solution under pressure of about 1% phosphatide. The phosphatide solution in petroleum ether and isobutane was sprayed at or onto a brush grained aluminum plate. The phosphatide can be applied in this manner as a solution if the nozzle is held close to the plate. As the distance between the nozzle and plate is increased, the phosphatide film is applied less and less as a solution and at about two feet a very fine phosphatide powder is applied to the aluminum plate as a coating of discreet particles. These plates may be developed in any of the ways described in the many examples presented.

As the base sheet 10 having a lithographic surface 12, it is preferred to make use of an aluminum base sheet in the form of a flexible aluminum frame the surface of which has been rendered hydrophilic and water receptive as by silicating in the process described in the Pewett et al. Pat. No. 2,714,066. Instead, use can be made of a base sheet of brush grained aluminum or an aluminum sheet having an oxidized surface or a surface which has been treated with an acid such as phosphoric acid, acrylic acid, polyacrylic acid, carboxymethyl cellulose, and the like. Instead of aluminum, use can be made of sheets of other amphoteric metals such as copper and zinc. Use can also be made of coated paper lithographic masters in which high wet strength paper is provided with a hydrophilic colloid coating including casein, as described in the Worthen Pat. No. 2,534,650; carboxymethyl cellulose, as described in the Van Dusen Pat. No. 2,542,784; and polyacrylate, as described in the Beatty Pat. No. 2,764,031, or an alginate, as described in the Ensink Pat. No. 2,806,424.

Exposure can be made with the rays from a carbon arc lamp, X-ray tube, beta-ray tube, U.V. light, daylight or direct sunlight, or the light source of light rays for a time depending somewhat on the intensity of the light in selected wave lengths. For example, with a carbon arc lamp, such as is available in a standard weatherometer, sufficient exposure can be made in from 1 to 20 minutes while longer times up to hours may be required for sunlight depending somewhat upon the position of the sun. It has been found that the phosphatide is most sensitive to light in wave lengths of 220 m$\mu$ to 340 m$\mu$, especially in the presence of heat, but the chemical reaction responsive to exposure to light waves will occur in response to exposure in wave lengths of light within the broad range of 220 to 900 m$\mu$. After a uniform exposure to light the application of heat increases the sensitivity to differential light exposure at wave lengths both in excess of 340 m$\mu$, particularly in the visible range, and at wave lengths below 340 m$\mu$. It is desirable therefore to make use of light having wave lengths concentrated within the preferred range and conversion of light waves to increase the concentration to within the preferred range may be effected by the presence of fluorescent converters in the phosphatide coating 14.

Exposure can be made through a negative transparency, as illustrated in FIG. 2 and described in Example 2. Exposure can also be made by direct print-through from a positive or by reflection from a positive or by reflex using either a positive original or a negative transparency.

For development to remove the unexposed non-imaged portions of the phosphatide coating in the negative working plate, use can be made of the same hydrocarbon solvent employed for preparation of solution of the phosphatide to form the coating. The solvent will remove the unexposed phosphatide which remains soluble to free the underlying lithographic surface while the insolubilized phosphatide which has been exposed to light remains on the surface of the plate to define the ink receptive, oleophilic imaged portion of the plate.

An important concept of this invention resides in the novel characteristics of the phosphatide coating whereby the same plate can be used as a negative working plate, as described in Examples 1 and 2, or as a positive working plate, as hereinafter described in Example 3.

EXAMPLE 3

Preparation of positive working plate

The plate of Example 1 is exposed in the same manner, as in Example 2, but instead of developing the exposed plate by swabbing with hexane or other hydrocarbon solvent for the phosphatide, the exposed plate is swabbed with water or other aqueous medium whereby it is the exposed portion, which has become water soluble, that is removed to free the underlying lithographic surface to form the non-imaged portion 26' while the unexposed water insoluble portion remains to constitute the ink receptive imaged portion 24' on the surface of the plate.

Heat has the effect of catalyzing the reaction to light in that lesser time is required for exposure in the presence of heat and it is believed that the heat operates also to complete the reaction of an exposed plate. Depending somewhat upon the character of the plate, use can be made of a temperature within the range of 200° to 450° F. for a time ranging from one minute to several hours at the lower temperature to 1 to 20 minutes at the higher temperature, as illustrated in the following Example 4.

EXAMPLE 4

A brush grained aluminum plate was sensitized by wash coating the brushed surface of the plate with a 5% solution of lecithin in hexane and air drying. Exposure was made through an original with the intense light of a Fade-O-Meter (carbon arc lamp) for two hours and then desensitized by washing with hexane after which the plate is heated to a temperature of 325° F. for several minutes. After cooling, the plate is rubbed with a gum arabic desensitizer and inked with a lithographic ink to produce an imaged plate from which a large number of copies of good quality can be produced by conventional lithographic technique including alternate applications of an aqueous repellent and an oleophilic ink.

Image development is enhanced by the presence of metal salts and preferably water soluble salts of such bivalent metals as calcium, cadmium, magnesium, nickel, strontium, barium, zinc, copper and the like, and also by water soluble salts of trivalent metals such as iron, aluminum and the like in which the salt is in the form of the metal acetate, chloride, fluoride, nitrate, phosphate or the like. The metal salt can be incorporated to form a part of the phosphatide coating but it is preferred to make use of the metal salt as a wash coat applied during development of the exposed phosphatide layer. Very often, it is desirable to make use of a weak acid, such as lactic acid, for pH adjustment of the metal salt solution.

EXAMPLE 5

A brush grained, silicated aluminum substrate was processed as in Examples 1 and 2 through the point of desensitizing the plate with hexane after exposure. The plate was wet, as by spraying, with a 25% solution of calcium chloride in aqueous medium and allowed to stand for 15 minutes. The surface was washed with water to remove free calcium chloride and the developed plate was then treated with a desensitizer of gum arabic and a developing ink.

When mounted on a conventional lithographic press and alternately wet with aqueous repellent and oleophilic ink the exposed areas retained the ink to define the imaged portions from which copy was produced.

EXAMPLE 6

In another experimentation a brush grained aluminum plate having a silicated surface was processed as in Examples 1 and 2 through the step of exposure under a negative transparency. After exposure, the plate was swabbed with a heavy mineral oil which removed unexposed phosphatide by solution and the mineral oil was removed by a fat solvent.

The plate was then gummed with gum arabic to prepare the imaged surface.

One-half of the imaged plate was wet with a solution of calcium chloride and lactic acid containing 75 parts by weight calcium chloride, 7 parts by weight lactic acid and 64 parts by weight of water, and then the plate was heated to 325° F. for 3 minutes.

The copy that was produced from the portion treated with calcium chloride indicated a higher contrast between the oleophilic, imaged portions and the hydrophilic, non-imaged portions whereby a more distinct copy of better quality was produced.

When use is made of metal salts in a wash coat, it is sufficient to make use of aqueous solutions in which the metal salts are present in an amount within the range of 0.1 to 30 percent by weight and when use is made of the metal salt as a component of the phosphatide coating, it is sufficient if the metal salts are present in the coating in a concentration within the range of .5 to 5 percent by weight.

The metal salts appear not only to enhance the reaction of the phosphatide catalyzed by the exposure to light but the metal salts appear also to operate as an insolubilizing agent to increase the strength of the imaged portion that is formed on the plate.

Various other materials can be used as promoters to enhance the light sensitivity of the phosphatide coating and to accelerate the reaction to light thereby to enable reduction in the time of the exposure and temperature. For this purpose, use can be made of chromates, such as ammonium bichromate, which may be incorporated as a component in combination with the phosphatide in the coating or as an undercoat or overcoat for the phosphatide coating or else applied as a wash coat to the exposed phosphatide layer. For this purpose, use can be made of a bichromate in an amount within the range of 0.1 to 10 percent by weight of the treating composition.

EXAMPLE 7

A non-silicated, brushed aluminum plate was coated four times with a 2.5% solution of lecithin in hexane to produce a phosphatide coating on the aluminum plate having a coating weight of 0.23 gram per square foot. The metal portion of the coating was wiped with a cotton pad containing a 0.25% by weight solution of ammonium bichromate. The plate was exposed as a negative transparency for 20 minutes to a carbon arc lamp. The exposed portions appeared to be darker in color and glossier than the unexposed portions. The exposed plate was heated to a temperature of 350° F. for 5 minutes and then desensitized with hexane and then developed by treatment with a 10% solution of calcium chloride followed by gumming with gum arabic and inking. The area covered by the bichromate produced a negative working ink image of good copy quality.

EXAMPLE 8

A brush grained, acid treated aluminum plate was coated first with a 1% aqueous solution of ammonium bichromate and the excess was removed as completely as possible with cotton. When dry, the bichromated surface was coated with a 2% solution of lecithin in hexane and then dried.

The sensitized plate was exposed under a negative by means of a 100 volt, 20 amp arc lamp for 20 minutes. The exposed plate was heated to a temperature of 325° F. for 3 minutes and then desensitized with hexane. The surface of the dry plate was then gummed and then mounted in an offset press from which at least 3,000 copies of good quality were produced by conventional lithographic duplicating technique.

Oxidizing agents have also found use as promoters materially to aid the reaction of light exposure, with or without subsequent treatment with heat and/or metal salts as previously described. Oxygen can be introduced into the reaction as by means of an oxidizing agent such as hydrogen peroxide, potassium permanganate, benzoyl peroxide and the like. For such purpose, the oxidizing agent can be incorporated as a component with the phosphatide in the coating composition but it is preferred to incorporate the oxidizing agent as a component separate and apart from the phosphatide coating, as by means of an overcoat in the sensitized plate or by means of a wash coat on the exposed plate. It will be sufficient if the oxidizing agent is present in a small amount such as from 0.1 to 3 percent by weight but larger amounts up to 5 percent by weight of the phosphatide coating can be employed. When applied as an overcoat onto the phosphatide coating or when applied as a wash coat onto the exposed layer, beneficial results can be achieved by application of an aqueous composition containing the oxidizing agent in an amount within the range of 2 to 30 percent by weight of the solution.

EXAMPLE 9

A lithographic plate was prepared as in Example 1 and exposed to a negative under a carbon arc lamp for one hour. The exposed layer was wet, as by means of a cotton pad containing a 30% solution of hydrogen peroxide. The treated plate was desensitized with benzene and mounted on a lithographic press from which copies of good quality were secured by conventional lithographic duplicating technique.

EXAMPLE 10

An aluminum plate was coated with a 2% solution of lecithin in hexane. Before exposure of the plate, the phosphatide coating was treated with a 30% solution of hydrogen peroxide and allowed to dry. The pretreated plate was then exposed to a negative transparency in a weatherometer for one hour. After exposure, the plate was desensitized by removal of the phosphatide in the unexposed portions with hexane. A clear image was visible on the plate which, after gumming and inking, was capable of producing a large number of copies of good quality by conventional lithographic duplicating technique.

The foregoing, which illustrates the use of oxidizing agents incorporated onto the phosphatide layer after and before exposure, can be practiced with others of the modifications previously described wherein image development and reaction is enhanced by the use of heat, metal salts and the like catalytic agents.

Other promoters which are not equivalent to the chromates or oxidizing agents but which operate to enhance the reaction without noticeable change in the resulting product include the use of such materials as benzoin and/or chlorophyll compounds and fluorescent agents which operate to convert light rays of shorter lengths into light rays of greater lengths and vice versa thereby to enable conversion of light during exposure to provide a higher concentration of light rays to which the phosphatide will be more responsive.

Such promoters as have heretofore been described can be employed in the phosphatide coating in an amount within the range of .1 to 3 percent by weight of the phosphatide.

The following examples will illustrate the further practice of the invention in the preparation of a photosensitive lithographic plate embodying the concepts previously described:

EXAMPLE 11

Corn phosphatide

A brush grained, silicated aluminum plate was coated with a 1% solution of corn phosphatide. The plate was exposed and developed in the manner of Example 2. A good image was obtained in which the image in the exposed areas appeared to be tougher and more resistant to walking off than the image produced with soy phosphatides.

EXAMPLE 12

Egg phosphatide

An anodized aluminum plate was coated with a 4% solution of egg phosphatide in hexane. After drying a layer was produced which was somewhat softer than the layer formed of soy phosphatide but otherwise similar. On exposure and development, as in Example 2, an imaged lithographic plate was secured from which multiple copies were produced by conventional lithographic duplicating technique.

EXAMPLE 13

Direct image plate

A casein coated paper base plate of the type produced by Addressograph-Multigraph was treated on its coated surface with a 5% solution of soy phosphatide in the manner described in Example 1 .

The dried plate was exposed for one hour to a positive original using a carbon arc lamp with the original in surface contact with the light sensitive layer. After exposure, the plate was heated to a temperature of 350° F. for from 5 to 10 minutes and the soy phosphatide in the unexposed portions of the plate was removed with a hydrocarbon solvent to define the nonimaged portions of the plate. The remaining soy phosphatide in the exposed portions was oleophilic and ink receptive and its oleophilic characteristics were improved by wash coating with a 5% solution of calcium chloride and again heating to a temperature of 325° F. for 3 minutes.

After gumming and inking, multiple copies of good quality were produced from the photolithographic plate by conventional lithographic duplicating technique.

A further novel concept of this invention resides in the ability to presensitize the phosphatide coating by treatment prior to exposure whereby the entire coating 14 is exposed to an overall pattern of light after which the exposed layer is heated to an elevated temperature. A phosphatide coating presensitized in the manner described can now be imaged in various ways including exposure to a light pattern in the manner previously described.

Such presensitizing of the phosphatide coating renders the coating more sensitive upon subsequent exposure in the imaged portions whereby higher contrasts between the ink receptive, water repellent imaged portion and the ink repellent, water receptive, non-imaged portion are obtained for the production of sharp copy of better quality with less exposure time for imaging the plate.

Surprisingly, presensitized plates prepared in this manner have better storage stability than untreated phosphatide coated elements. I believe that the combination of uniform light exposure and heat treatment substantially inactivates autooxidizable centers in the phosphatide or results in complete reaction of the autooxidizable centers thereby decreasing the sensitivity of the phosphatide layers to oxygen, water and other chemicals in the atmosphere which have a degradative effect on the unsaturation in fatty materials.

The following example will illustrate a presensitized plate which is imaged by photo-exposure:

EXAMPLE 14

A brush grained, silicated aluminum plate was coated with a 5% solution of soy phosphatide in hexane. The coated plate was exposed to light in a weatherometer for one hour. After drying the exposed coating was heated in an oven at 150° C. for 10 minutes during which the coating took on a brownish color and a glossy appearance.

After cooling, the presensitized phosphatide coating was re-exposed through a negative with a carbon arc lamp for one hour. A sharp image formed in the exposed areas. The plate was then desensitized with distilled water and developed by gumming and inking. The exposed areas were hydrophilic preferentially to receive the aqueous repellent while rejecting ink and the unexposed areas in which the phosphatide layer remained was oleophilic and ink receptive to constitute the imaged portion which received ink to produce copy of good quality by conventional lithographic duplicating technique.

EXAMPLE 15

A silicated aluminum plate was coated with soy phosphatide from a 10% solution in hexane. The phosphatide coating was exposed for one hour to a 40 amp, 220 volt carbon arc in a weatherometer. The exposed coating was heated to a temperature of 150° C. for 10 minutes as in the previous example.

The presensitized plate was then processed in Example 2 to produce a negative working plate from which copy of good quality was produced.

EXAMPLE 16

Thermographic plate

A presentized plate which is capable of thermographic imaging was prepared by uniformly exposing a soy phosphatide coated plate in a weatherometer for one minute or more. For image development the presensitized plate 30 was exposed to a lamp 32 capable of producing radiations high in infrared. The coated surface of the presensitized plate was contacted during exposure with a positive original 34 in which the imaged portion 36 to be reproduced contained infrared ray absorbing, heat generating material whereby a heat pattern 38 corresponding to the original was generated during radiation. The heat pattern was effective to form a corresponding image 40 in the underlying presensitized coating to produce a direct readable copy upon separation of the original or from which an imaged plate can be formed by development, as in Example 2.

It is possible to subject the phosphatide coated plate sequentially to uniform light exposure and heat. After each uniform light exposure, the presensitized plate is thermographically sensitive. This sequential treatment can be employed several times.

In the modification of Example 16, image development is enhanced by wash coating the surface of the presensitized layer with a metal salt or chromate of the type previously described.

An imaged plate from which multiple copies can be produced by lithographic technique can also be prepared without the development steps described after exposure. For this purpose, the exposed plate, with or without heat treatment, and with or without a metal salt wash coat prior to heat treatment, can be mounted directly onto the plate cylinder of a lithographic press for the production of copy but this modification is limited to a plate wherein the exposed portion is converted to a water soluble, water receptive substance which will take the water when wet by the aqueous repellent and repel the ink, or it may be that the aqueous repellent also dissolves the water soluble phosphatide in the exposed portions to produce the working plate. The foregoing can be illustrated by following example:

EXAMPLE 17

A brush grained, non-silicated aluminum plate was provided with a phosphatide coating from a 2.5% solution of lecithin in hexane. After drying, the phosphatide coating was exposed for two hours to bright sunlight through a negative. The exposed plate was directly mounted onto a lithographic press to be wet with a fountain solution for a number of revolutions before the ink roll was adjusted into position of use. Copy was secured by the repeated wetting and inking in accordance with conventional lithographic duplicating technique.

It will be apparent from the foregoing that the light sensitive phosphatide coating embodies a number of novel characteristics that enable a number of ramifications to be made in the uses thereof to produce an imaged lithographic master. These same characteristics and perhaps others permit usage of the light sensitive phosphatide for the preparation of other types of duplicating masters which depend upon other techniques for image development thereby to illustrate the versability of the light sensitive material of this invention.

For example, use can be made of the light sensitive phosphatide coating in the preparation of a stencil when the phosphatide coating is provided on a porous stencil base tissue as will hereinafter be described.

A porous stencil base tissue 50 was immersed for a number of times in a 5% solution of soy phosphatide in hexane with drying intermediate each dipping step. A phosphatide coating 52 formed on the surfaces of the stencil base tissue which was relatively impervious to the transmission of stencil ink.

The formed stencil sheet was exposed for one hour to a 40 amp, 220 volt carbon arc through a negative transparency and the exposed stencil was then washed gently with distilled water. The phosphatide in the exposed areas was removed by solution in water and flushed away to leave stencil openings 54 through which ink may pass for the development of copy by conventional stencil duplicating technique.

The life of the stencilized sheet produced in accordance with the foregoing example can be further increased by treatment of the stencilized sheet with a 40% solution of calcium chloride acidified with lactic acid and drying at a temperature of 105° C. for a few minutes.

A printing plate can be produced which operates on a resist process whereby an image in intaglio or relief is formed on the metal surface.

EXAMPLE 18

A substrate in the form of a copper plate suitable for photoengraving was cleaned with rose tripoli, white tripoli, distilled water and acetone respectively and then wet with a 2% solution of lecithin in hexane.

The dried plate was exposed to bright sunlight for two hours through a negative transparency. The exposed plate was flushed with hexane for removal of the phosphatide coating in the unexposed portions to produce a blue positive image of a negative working plate which slowly turned to a copper color on a brown background as the exposed metal oxidized.

Figure 8:
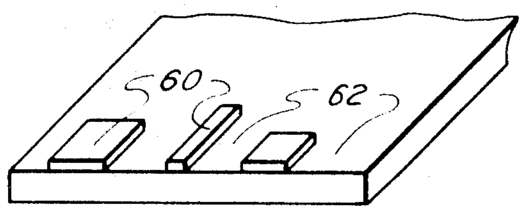
FIG. 8 is a perspective view of a photo-engraved plate prepared in accordance with the practice of this invention.
Figure 9:
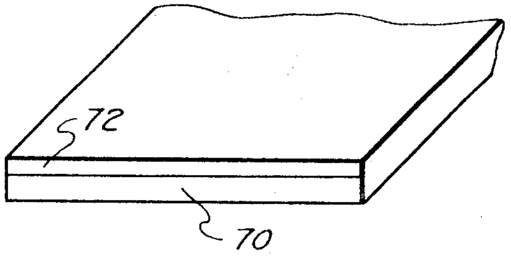
FIG. 9 is a perspective view partially in section of a master sheet embodying the features of this invention and adapted for use in a diffusion process for copy reproduction.
Figure 10:
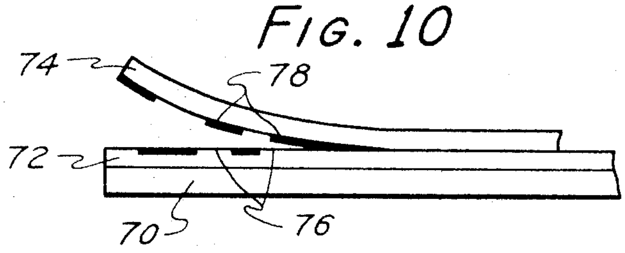
FIG. 10 is a sectional elevational view showing the arrangement of elements for the preparation of copy from the imaged master of FIG. 9.
Figure 11:
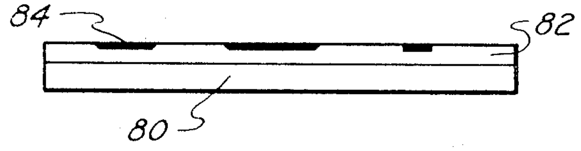
FIG. 11 is a sectional elevational view of a master imaged in accordance with the practice of this invention.

The plate was immersed in a ferric chloride solution (40° Bé.) for 4 minutes and then removed, rinsed and polished with a photo-engraver's "putz" to reveal bright copper colored raised letters 60 against the etched copper background 62 as illustrated in FIG. 8.

The contrast between water and solvent solubility of the imaged and non-imaged portions of an exposed phosphatide coating can be employed in the preparation of a duplicating master wherein a portion of the coating, corresponding to the imaged portion, is dissolved for displacement to a copy sheet when the latter is wet with a solvent for the phosphatide coating that forms the imaged portion and when the wet copy sheet is brought into surface contact with the exposed imaged master, as in the "Varifax" process.

For this purpose, the plate can be developed as in the previously described lithographic imaging processes, with or without the use of heat, and with or without the use of metal salts, oxidizing agents and other promoters, but in which the phosphatide coating is formulated to contain a high concentration of pigment (20–75%) or a high concentration of a dyestuff (3–20%) by weight, to provide readability to the portion of the coating which is dissolved for transfer to the copy sheet.

EXAMPLE 19

A paper base sheet 70, plastic film or metal foil is coated, as by a flow-coat process, brush coat process, spray coating and the like to apply two coats with intermediate drying of a 10% aqueous dispersion of egg phosphatide containing 25% by weight of crystal violet dyestuff to provide a continuous coating 72 on the surface of the paper base sheet.

Exposure is made in the usual manner to a positive original or negative transparency and the light exposed master is heated to 325° F. for about 10 minutes. As in the previously described procedures for preparation of a lithographic plate, the exposed portions become water soluble and hydrocarbon solvent insoluble while the unexposed portions remain hydrocarbon soluble and water insoluble.

In the production of copy, the copy sheets 74 are wet on the surface with a quick drying hydrocarbon solvent such as trichloroethylene, and the wetted surface of the sheet is pressed into surface contact with the exposed phosphatide layer 72 to dissolve some of the phosphatide layer in the unexposed areas 76 for transfer to the copy sheet to produce copy 78 thereon. It is possible to secure as many as 8 to 10 copies before the image is substantially exhausted.

EXAMPLE 20

In the event that copy is desired of the exposed portions of the master produced in Example 19, the copy sheets can be wet with an aqueous composition whereby the exposed water soluble portion of the coating is dissolved for transfer from the imaged master to the copy sheet for the production of copy.

EXAMPLE 21

The phosphatide layer, produced in accordance with the practice of this invention, is also capable of use in the preparation of an imaged master for use in a copy process, referred to in the trade by the name "adhereography," wherein a copy sheet wet with a solvent for solution either of the exposed or unexposed portions of a colorless or colored exposed phosphatide coating is brought into surface contact with the exposed phosphatide layer for transfer of a portion of the exposed layer to the copy sheet, as in Examples 19 and 20.

The latent image which is transferred by solution to the copy sheet can subsequently be developed by a dry powdered toner, as in the electrostatic (Xerox) process in which colored pigment will adhere to the sticky wet latent image on the copy sheet for full image development.

EXAMPLE 22

This example illustrates the preparation of a bimetallic printing plate. A brush grained aluminum plate was coated with soybean phosphatides in the manner described in Example 7 and exposed to light through a pattern. The plate was then placed in a copper salt bath, which was prepared by dissolving 25 grams of cuprous chloride in 100 ml. of water and neutralizing with ammonia until the solution turned blue, for from 2 to 10 minutes. The plate was then flushed with hexane forming a bright copper or copper oxide image in the areas which had been exposed to light with a hydrophilic aluminum background. The plate prepared in this manner can be used in lithographic printing.

Essentially the same results were obtained by using a cupric ammonium salt bath except that the image areas of the plate were black rather than shiney.

When the cuprous chloride and cupric chloride baths were employed without the adjustment of pH with ammonia, the same copper or copper oxide images were formed. However, it is considered that the images formed under alkaline conditions were somewhat better, with the cuprous ammonia salt being the best.

The technique described above can be employed to prepare printed circuits by employing a non-conductive base in place of aluminum, such as polystyrene.

EXAMPLE 23

This example illustrates the development of an image using an iodide salt bath. A 2% solution of soybean phosphatide in hexane which contained 0.25% by weight oil red dye was poured over a sheet of plain paper and allowed to dry. The sheet was placed under a negative and exposed in the Weather-O-Meter for one hour. The sheet was dipped in a 5% solution of potassium iodide and a very clear brown image formed.

When this example was repeated except that the oil red dye was omitted from the phosphatide solution and a small amount of pasted starch was added to the potassium iodide solution, a very clear blue image was formed.

EXAMPLE 24

A 2% solution of lecithin and hexane was poured over a sheet of plain paper and allowed to dry, exposed to light in the manner described in the preceding example. After the sheet was treated with a potassium iodide bath, a clear image appeared. The sheet was squeezed against a dampened sheet of paper in a roller, forming a visible transfer of the image to the second sheet.

EXAMPLE 25

A sheet of ordinary "bond" white paper was flushed with a 5% solution of soy phosphatides in hexane, dried and exposed to light from a Weather-O-Meter for one hour. The light sensitive sheet was placed in contact with a positive transparency and passed through a commercial "Thermofax" machine. A distinct positive image developed on the paper in a brown color.

As explained in copending application Ser. No. 796,847 filed on even date, Feb. 5, 1969, in the names of Hayes, Jones and Thompson, phosphatide latent images can also be developed by physically embedding powder particles as a monolayer in a stratum at the surface of the phosphatide layer by suitably adjusting the phosphatide layer thickness and size of the powder particles.

Since many embodiments of this invention may be made and since many changes may be made in the embodiments described, the foregoing is to be construed as illustrative only and my invention is defined by the claimed appended hereafter.

I claim:

1. An article of manufacture consisting essentially of a substrate and a coating on the surface of the substrate containing actinic radiation sensitive, solid, substantially oil-free phosphatide particles.

2. A pre-sensitized element capable of thermographic imaging comprising a substrate and a coating on at least one surface of the substrate of a heat sensitive layer of a solid, water-soluble, substantially oil-free phosphatide layer.

3. An imaged duplicating master comprising a flexible base sheet, a coating on the surface of the base sheet formed of a solid, light sensitive phosphatide and in which one portion of the phosphatide layer, which has been exposed to light, is water soluble and solvent insoluble while the remainder of the phosphatide, which has not been exposed to light, remains water insoluble and solvent soluble.

4. An imaged duplicating master as claimed in claim 3 which includes means in the master for mounting the imaged master for a duplicating machine.

5. In the method of preparing an imaged lithographic master comprising providing a master formed of a base sheet having a water receptive, ink repellent, water insoluble, hydrophilic, lithographic surface and a coating on the lithographic surface formed of a light sensitive phosphatide, exposing the phosphatide coating to a light pattern whereby change occurs in response to exposure to light to convert the water insoluble phosphatide to a water soluble material in the exposed portions, treating the exposed phosphatide coating with an aqueous composition to dissolve off exposed phosphatide whereby the underlying lithographic surface forms the non-imaged portion of the master while the phosphatide coating in the unexposed portions remains to define the ink receptive, water repellent image.

6. In the method of preparing an imaged lithographic master comprising providing a master formed of a base sheet having a lithographic surface and a coating on the surface of a light sensitive, water insoluble, solvent soluble phosphatide, exposing the phosphatide coating to a light pattern whereby the exposed portions of the phosphatide coating become water soluble while the unexposed portions remain water insoluble and solvent soluble, flushing the phosphatide layer with a solvent for the phosphatide to dissolve off unexposed portions of the phosphatide coating to expose the underlying lithographic surface which represents the non-imaged portion of the master while phosphatide in the exposed portion remains to define the ink receptive, water repellent image.

7. The method as claimed in claim 6 which includes the step of heating the exposed master to a temperature within the range of 200–450° F. prior to flushing with the solvent.

8. The method as claimed in claim 6 which includes the step of wash coating the exposed phosphatide coating with an aqueous solution of a water soluble polyvalent metal salt prior to flushing with the solvent.

9. The method as claimed in claim 6 which includes the step of wash coating the exposed phosphatide coating with an aqueous solution of a water soluble polyvalent metal salt and then heating the exposed phosphatide coating after wash coating to a temperature within the range of 200–450° F. prior to flushing with the solvent.

10. The method of developing a latent image which comprises exposing the phosphatide surface of an element comprising a substrate bearing a layer of solid, substantially oil-free phosphatide particles to actinic radiation through a pattern, thereby forming a latent image and continuing said exposure to convert said latent image into a visible image.

11. The method of developing a latent image which comprises exposing the phosphatide surface of an element comprising a substrate bearing a layer of solid, substantially oil-free phosphatide particles to actinic radiation through a pattern, thereby forming a latent image and converting said latent image to a visible image by placing said element in a substantially actinic radiation free environment.

12. The method of claim 11 wherein said latent image is converted into a visible image by heating in a dark environment.

13. The method of developing a latent image which comprises exposing the phosphatide surface of an element comprising a substrate bearing a layer of solid, substantially oil-free phosphatide particles to actinic radiation through a pattern, thereby forming a latent image and converting said latent image to a visible image by chemical means.

14. The method of claim 13 wherein said image is developed by placing the latent image in an aqueous cuprous salt bath.

15. The method of claim 13 wherein said chemical development is by placing said image in an aqueous iodide salt bath.

16. The method of claim 15 wherein said iodide salt bath comprises pasted starch.

17. The method of developing a latent image which comprises exposing the phosphatide surface of an element comprising a substrate bearing a layer of solid, substantially oil-free particles to actinic radiation through a pattern, thereby forming a latent image, applying uniformly to said phosphatide surface a non-polar wax and developing said image by heating the element to a temperature above the melting point of the wax whereby the non-polar wax flows away from the exposed portions of the phosphatide layer.

18. The method of developing a latent image which comprises exposing the phosphatide surface of an element comprising a substrate bearing a layer of solid, substantially oil-free phosphatide particles to actinic radiation through a pattern, thereby forming a latent image applying uniformly to the phosphatide surface of said element a polar high-melting material, and heating said polar high-melting material to a temperature above its melting point whereby the polar high-melting material flows away from the unexposed portions of the phosphatide layer.

19. The method of forming a thermographic sensitive element which comprises the steps of exposing the phosphatide surface of an element comprising a substrate bearing a layer of solid, substantially oil-free phosphatide particles to uniform actinic radiation.

20. The method of forming a latent image which comprises exposing the phosphatide surface of an element comprising a substrate bearing a layer of solid, substantially oil-free phosphatide particles to light having a wave length of about 220–900 mμ.

21. The method of claim 20 wherein the wave length of said light is in the range of 220 mμ to 340 mμ.

22. The method of preparing a light sensitive phosphatide element which comprises exposing the phosphatide surface of an element comprising a substrate bearing a layer of solid, substantially oil-free phosphatide particles to uniform actinic radiation, followed by uniform heating.

23. The method of claim 22 wherein said uniformly light exposed plate is heated to a temperature of about 200–450° F.

24. The method of preparing a bimetallic printing plate which comprises exposing to actinic radiation through a pattern a light sensitive element formed of a metal base having a hydrophilic lithographic surface and a coating on the surface of a light sensitive, water insoluble solvent soluble phosphatide whereby the exposed portions of the phosphatide coating becomes water soluble, placing the exposed element in a copper salt bath, flushing the phosphatide layer with a solvent for the phosphatide to dissolve off the unexposed portions of the phosphatide coating to expose the underlying hydrophilic metal surface.

25. The method of preparing a printed circuit which comprises exposing to actinic radiation through a pattern a light sensitive element formed of a non-conductive base and a coating on the surface of a light sensitive, water insoluble solvent soluble phosphatide whereby the exposed portions of the phosphatide coating become water soluble, placing the exposed element in a copper salt bath, flushing the phosphatide layer with a solvent for the phosphatide to dissolve off the unexposed portions of the phosphatide coating to expose the underlying non-conductive surface.

References Cited

FOREIGN PATENTS 702,614 1/1954 Great Britain ---------- 96—88

OTHER REFERENCES

Kogel: Chemical Abstracts, vol. 31, 8670(3), 1937.

Roffo and Correa: Chemical Abstracts, vol. 32, 201(9), 1938.

NORMAN G. TORCHIN, Primary Examiner

R. E. FICHTER, Assistant Examiner

U.S. Cl. X.R.

96—28, 36.2, 36.3, 36.4, 48, 88; 250—65